United States Patent

Heidelberg et al.

[11] Patent Number: 5,478,222
[45] Date of Patent: Dec. 26, 1995

[54] FLUID PUMP HAVING A PRESSURE SEALED MOTOR CHAMBER

[76] Inventors: Götz Heidelberg, Am Hügel 16, D-82319 Starnberg; Peter Ehrhart, Saalburgstrasse 24a, D-81375 München; Otto W. Stuckmann, Lissstrasse 31, D-45657 Recklingshausen; Roland Fischer, Markstrasse 399, D-44795 Bochum, all of Germany

[21] Appl. No.: 133,050

[22] PCT Filed: Apr. 9, 1992

[86] PCT No.: PCT/EP92/00812

§ 371 Date: Oct. 12, 1993

§ 102(e) Date: Oct. 12, 1993

[87] PCT Pub. No.: WO92/18774

PCT Pub. Date: Oct. 29, 1992

[30] Foreign Application Priority Data

Apr. 10, 1991 [DE] Germany ............... 41 11 713.1

[51] Int. Cl.[6] .................................................. F04B 35/04
[52] U.S. Cl. ................ 417/414; 417/423.7; 417/423.11
[58] Field of Search ........................... 417/410 R, 414, 417/423.7, 423.8, 423.11, 423.14, 902

[56] References Cited

U.S. PATENT DOCUMENTS

| 1,928,795 | 10/1933 | Reid | 417/423.11 |
|---|---|---|---|
| 2,911,919 | 11/1959 | Tucker | 417/414 |
| 3,473,475 | 10/1969 | Martini | . |
| 3,746,472 | 7/1973 | Rupp | 417/424 |
| 4,065,232 | 12/1977 | Stratieuko | 417/424 |
| 4,198,191 | 4/1980 | Pierce | 417/414 |
| 4,836,147 | 6/1989 | Morris | 417/423.7 |
| 5,368,439 | 11/1994 | Piazza | 417/423.11 |

FOREIGN PATENT DOCUMENTS

| 1403854 | 11/1969 | Germany . |
|---|---|---|
| 2846950 | 5/1979 | Germany . |
| 58-140500 | 8/1983 | Japan . |

*Primary Examiner*—Richard A. Bertsch
*Assistant Examiner*—Charles G. Freay
*Attorney, Agent, or Firm*—Spencer, Frank & Schneider

[57] ABSTRACT

A pump of compact design, which is hermetically sealed to the outside and has no shaft lead-outs to the outside, includes a housing with an internal partition dividing the inside of the housing into a drive section and a pump section. A single shaft, which is supported in the partition, carries on one side the rotor of an electric drive motor and on the other side the impeller of the pump. In the cavity of the drive section, a gas pressure is generated which assists in preventing the pumping material from passing into the drive section.

22 Claims, 1 Drawing Sheet

FLUID PUMP HAVING A PRESSURE SEALED MOTOR CHAMBER

BACKGROUND OF THE INVENTION

The invention relates to a fluid pump comprising an electric drive motor having an impeller of a pump section mounted on its shaft, and comprising a housing.

The invention specifically relates to powerful pumps having an electrical power requirement in the range of 10 kW and more. So far, such pumps were usually installed with considerable expenditure in piping systems, with the expenditure being caused primarily by the fact that the drive of the pump unit proper was effected via a motor flange-mounted to the outside of the pump housing.

Such pump aggregates, with a power of 10 kW and more, are heavy and bulky and require specific support on a fixed foundation and thus cannot be integrated directly in the given piping path.

There are specific legal regulations concerning the design of pumps, in particular pumps used for pumping environmentally hazardous fluids. It must be ensured with certainty that leakage of environmentally hazardous pumping material is prevented. This leads to specific problems with respect to the sealing of the shaft passage. In the pumps used so far, the rotary shaft left the housing at at least one location of the pump housing. This is where special sealing measures must be taken.

SUMMARY OF THE INVENTION

It is the object of the invention to make available a fluid pump of the type indicated at the outset which, on the basis of its compact construction, may easily be installed in piping systems without any specific support problems and which, furthermore, reliably prevents the leakage of pumping material by avoiding shaft passages or lead-outs in the housing.

According to the invention, this object is met with a fluid pump of the type indicated in that the housing is hermetically sealed jointly for the drive motor and the rotary parts of the pump section and is formed without shaft lead-out to the outside, that a partition having a shaft passage bore and separating a drive section containing the drive motor from the pump section is formed within the housing, and in that a gas having a specific pressure is contained in a cavity of the drive section containing the drive motor.

Seen from the outside, the housing of the pump according to the invention is a completely hermetically sealed structure. There are no locations at which the shaft is led out to the outside. This results in particularly good hermetic sealing of the housing. The partition in the interior of the housing provides that the pump section is sufficiently separated from the drive section and that, thus, practically no pumping material can reach the cavity of the drive section. This is of particular importance when aggressive pumping material is involved that could possibly damage parts of the drive section. The separation is further enhanced by a seal on the rotary shaft, which is located between the pump section and the drive section. The gas in the cavity of the drive section is regulated with respect to its pressure preferably by a pressure regulator. This allows a pressure equilibrium between the gas within the drive section on the one hand and the pumping material in the pump section on the other hand. It is also possible to set the gas pressure to a slightly higher pressure as compared to the pressure of the pumping material. In addition to the seal between the rotary shaft and the bore of the partition, the gas pressure thereby assists in keeping pumping material away from the drive section.

However, it may nevertheless happen that, despite an operating seal and retention of the pumping material by means of an increased gas pressure in the drive section, some of the possibly aggressive pumping material reaches the drive section. According to the invention, a sump is therefore provided in the cavity of the drive section in which overflow pumping material is collected. The overflow pumping material can be pumped back to the pump section via a return line provided with a valve. The entire drive section is thus well protected against possible damages due to aggressive pumping material.

The drive section is preferably water-cooled. Thus, within the region of the drive section and therefore within the entire housing, there are provided only one passage for the electrical connections, one passage for coolant connections and possibly one passage for a pressurized gas connection, when the necessarily provided openings of the housing for the inflow and outflow of the pumping material are disregarded.

The drive motor preferably is provided in the form of an external rotor motor equipped with a cup-shaped rotor. The rotor flange is connected directly to the drive shaft. Preferred is a motor with excitation by permanent magnets and electronic commutation of the stator current. These motors can be built in a particularly compact manner, especially when these are motors according to the flux collection principle for increasing the permanent-magnetic flux density in the air gap, and they are convenient to regulate.

To further enhance the reliability of the pump as a whole, the invention provides that all stationary and rotary parts of the drive motor are mechanically hermetically protected so that they cannot be attacked by the possibly overflow pumping material.

For obtaining as compact as possible pump unit, the diameter of the drive motor according to the invention is chosen to be greater than or at the most equal to the length of the motor, and preferably the external diameter of the rotary pump parts and the diameter of the drive motor are equal.

The external rotor motor can be designed with a cantilever support for the rotor. "Cantilever support" means that the cup- or bell-shaped rotor has a peripheral section and a rotor flange extending perpendicularly to the axis of rotation, the drive shaft being connected via a shaft connection to the rotor flange and projecting not into the interior of the rotor. This "cantilever support" provides the possibility of hermetically sealing the stator on its side facing the rotor flange, in order to sealingly connect it on the side remote from the rotor flange to an annular lid of the housing so that the interior of the stator is exposed towards the external environment. Cooling of the motor in the region of the stator can thereby be improved.

However, it is also possible to support the motor shaft in an end wall portion of the drive section, in addition to support thereof in the region of the partition between the drive section and the pump section or support thereof in the outer part of the pump section.

In the suggested type of design it is also particularly simple to extend the hermetic seal to the category "explosion-proof".

BRIEF DESCRIPTION OF THE DRAWINGS

Embodiments of the invention will now be elucidated in more detail with reference to the drawings in which.

DETAILED DESCRIPTION OF THE INVENTION

Figure 1:
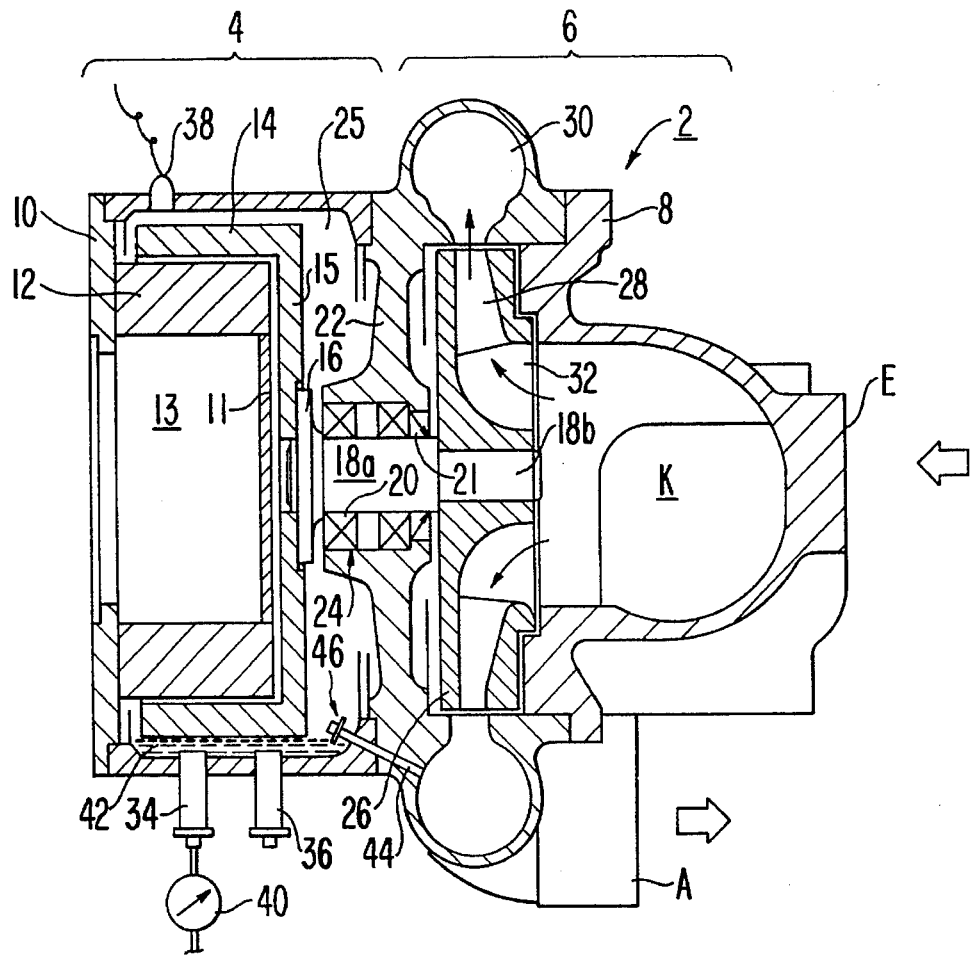
FIG. 1 shows a longitudinal sectional view of a first embodiment of a fluid pump.

The fluid pump 2 shown in FIG. 1 into a longitudinal sectional view can be conceived to be divided in a drive section 4 and a pump section 6, with the drive section 4 and the pump section 6 being formed in a hermetically sealed housing 8 consisting of light metal or of plastics material.

On the left side in FIG. 1 the housing 8 is partly closed by a cover ring 10 on the inside of which a stator 12 is mounted in a hermetically sealed manner, the stator 12, on the side facing away from cover ring 10, being provided with a sealed top 11.

Engaging over the stator 12 is a cup-shaped rotor 14 which, via a rotor flange 15 and a shaft connection 16, is connected to a section of large diameter 8a of a drive shaft.

Between drive section 4 and pump section 6 the housing 8 is divided by a partition 22 provided with a through-bore 24 in which a bearing assembly 20 rotatably supports section 18a of the shaft 18. A seal 21 is provided adjacent the bearing assembly 20.

A hermetically sealed cavity 25 is thus formed in drive section 4, which contains pressurized gas, e.g. air.

The above-described support of the cup-shaped rotor 14 merely on the outside of the rotor flange 15 is referred to as cantilever support.

The shaft has a section 18b of a small diameter formed integrally with the section 18a of a large diameter, with the small diameter section having an impeller 26 keyed thereon. The impeller 26 has, in a manner known per se, radial channels 28 and an annular groove 32 so that pumping material entering a pump cavity K through an inlet opening E is passed into the annular groove 32 and then is urged, by the centrifugal force of the rotating impeller 26, through the radial channels 28 into an outer annular channel 30 from which the pumping material is then axially discharged through outlet A in the direction of the arrow.

Not shown in the drawing are holding parts for controlling the drive motor comprising the stator 12 and the rotor 14. A cable lead-out 38 is shown to the upper left in FIG. 1.

To the lower left in FIG. 1, a pressurized gas connection 34 and a coolant connection 36 are outlined. Via the pressurized gas connection 34, pressurized gas—regulated by means of a pressure regulator 40—is fed into the cavity 25 of the drive section 4, with the pressure of the gas in cavity 25—with a given pressure of the pumping material in pump section 6—being set such that it is at least as high as the pressure of the pumping material. The sealing effect of seal 21 is further enhanced thereby since the pressurized gas presents a counter-pressure towards possibly overflowing pumping material in the region of shaft section 18a.

Cooling water, for example, flows via the coolant connection 36 into the portion of the drive section 4 and is passed to the drive motor via cooling channels, not shown.

In the lower portion of the housing 8, a sump 42 is provided in the drive section 4. This sump 42 serves to collect small amounts of pumping material which have entered into the drive section despite the very high tightness between the drive section and the pump section.

A return line 44, which is equipped with a valve 46 in the region of drive section 4, extends from sump 42 to annular channel 30 so that pumping material can be pumped back from the sump 42 to the pump section if necessary.

Except for the lead-outs or passages 38 for the electrical cables and the connections 34 and 36 for pressurized gas and coolant, respectively, the housing 8 as a whole has no lead-outs (of course apart from pumping material inlet E and pumping material outlet A). The shaft is supported in the region of partition 22. In case pumping material penetrates in the region of the shaft, this material does not leak to the outside, but merely flows into cavity 25 where the overflown pumping material may be collected in sump 42 in order to be pumped back from there.

Figure 2:
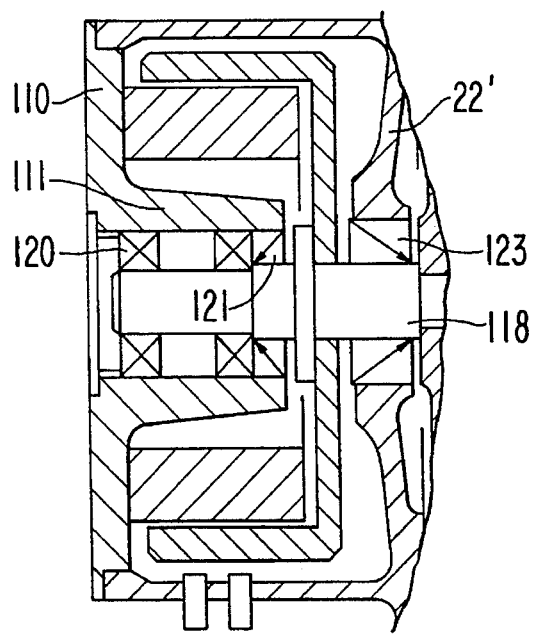
FIG. 2 shows the drive section of a second embodiment of a fluid pump which, for the rest, is of identical construction as the embodiment according to FIG. 1.

FIG. 2 shows a similar embodiment to that of FIG. 1, however with a different structure of the support of the rotor in FIG. 2.

While according to FIG. 1 a cover ring 10 is provided on the left-hand end side of housing 8, the embodiment according to FIG. 2 has a closure lid 110 provided on the left-hand end wall of the housing, the closure lid being formed integrally with a bearing receiving extension 111 projecting into the interior of the housing. Disposed in this bearing receiving extension 111 is a bearing assembly 120 for the drive shaft 118. In addition to the bearing assembly 120 a seal 121 for protecting the bearing is provided inside the bearing receiving extension.

In the region of the partition 22' there is provided an additional seal 123. With this embodiment the closure lid 110 can be closed on its outside by a cap or the like so that a hermetic sealing effect of the entire housing is ensured. In the region of the seal, preferably an additional support for the shaft is provided which alternatively may be arranged on the outside of the pump section.

The embodiment shown in FIG. 1 may also be modified such that the stator is open in the region of the rotor flange 15, whereas the central portion of the cover ring 10 is closed by a cap.

We claim:

1. A fluid pump comprising:

a hermetically sealed housing;

a partition located within said housing and having a passage bore therethrough;

a drive section formed within said housing and defining a cavity containing a gas having a specific pressure, said drive section comprising an electric drive motor located within the cavity, said electric drive motor including:

a stator;

a drive shaft extending through the passage bore of said partition and being located entirely within said housing; and a cup-shaped rotor externally located relative to said stator and having a rotor bottom located on a side of said partition and connected to said drive shaft, and being supported in a cantilevered manner by said partition; whereby said motor is subject to an excitation caused by permanent magnets and to electronic commutation of a stator current; and a pump section formed within said housing and being separated from said drive section by said partition, and comprising an impeller mounted on said drive shaft.

2. A fluid pump according to claim 1, further comprising a seal on the drive Shaft and located between said pump section and said drive section.

3. A fluid pump according to claim 1, wherein a pumping material in said pump section and the gas within the cavity in said drive section are under a pressure equilibrium.

4. A fluid pump according to claim 1, wherein the gas within the cavity in said drive section has a higher pressure than a pumping material in said pump section.

5. A fluid pump according to claim 1, further comprising a pressure regulator for regulating the specific pressure of the gas to adjust a pressure difference between a pumping material and the gas.

6. A fluid pump according to claim 1, wherein said drive motor has an electrical power requirement of at least 10 kW.

7. A fluid pump according to claim 1, further comprising a sump located in the cavity of said drive section for collecting overflow pumping material from said pump section.

8. A fluid pump according to claim 7, further comprising a return line through which the overflow pumping material of said sump is pumped back to said pump section.

9. A fluid pump according to claim 1, wherein said drive section is provided only with at least one cable coolant, and a pressurized gas connection.

10. A fluid pump according to claim 1, wherein the rotor bottom is connected directly to said drive shaft.

11. A fluid pump according to claim 1, wherein the drive motor is designed in accordance with a flux collection principle for increasing a permanent-magnetic flux density in an air gap.

12. A fluid pump according to claim 1, wherein all parts of said drive motor are mechanically hermetically protected to prevent contact with overflow pumping material.

13. A fluid pump according to claim 12, wherein the overflow pumping material is aggressive.

14. A fluid pump according to claim 1, further comprising liquid cooling means for cooling said drive motor.

15. A fluid pump according to claim 1, wherein a diameter of said drive motor is equal to or greater than a length of said drive motor.

16. A fluid pump according to claim 1, wherein a diameter of the impeller of said pump section is approximately equal to a diameter of said drive motor in said drive section.

17. A fluid pump according to claim 1, wherein said cup-shaped rotor engages over said stator from one side thereof, said stator having an interior open towards the environment and being hermetically sealed towards the cavity of said drive section.

18. A fluid pump according to claim 1, wherein said cup-shaped rotor engages over said stator from one side thereof, said stator having an interior hermetically sealed towards the environment and being open towards the cavity of said drive section.

19. A fluid pump according to claim 1, wherein said stator has an interior hermetically sealed towards the environment and towards the cavity of said drive section.

20. A fluid pump according to claim 1, wherein said hermetically sealed housing is explosion-proof.

21. A fluid pump comprising:

a hermetically sealed housing having an end wall member;

a partition located within said housing and having a passage bore therethrough;

a drive section formed within said housing and defining a cavity containing a gas having a specific pressure, said drive section comprising an electric drive motor located within the cavity, said electric drive motor including:

a stator;

a drive shaft extending through the passage bore of said partition and being located entirely within said housing, said drive shaft being supported by said end wall member at a location concentrically corresponding to a center of said stator and being additionally supported by a support at a position located at one of between said drive section and said pump section, and inside said drive section; and a cup-shaped rotor coaxially arranged with said stator and externally located relative to said stator and having a rotor bottom located on a side of said partition and connected to said drive shaft; whereby said motor is subject to an excitation caused by permanent magnets and to electronic commutation of a stator current; and a pump section formed within said housing and being separated from said drive section by said partition, and comprising an impeller mounted on said drive shaft.

22. A fluid pump according to claim 21, wherein said end wall member comprises a closure lid.

* * * * *